United States Patent

Reilly, Jr. et al.

[15] 3,654,562
[45] Apr. 4, 1972

[54] SELECTIVELY SAMPLING RECEIVED SIGNALS

[72] Inventors: Robert A. Reilly, Jr., North Caldwell; James P. Van Etten, Nutley; Joseph Heinen, West Caldwell, all of N.J.

[73] Assignee: International Telephone and Telegraph Corporation, Nutley, N.J.

[22] Filed: July 29, 1970

[21] Appl. No.: 59,231

[52] U.S. Cl. ............................................. 328/151, 328/115
[51] Int. Cl. ................................................... H03k 17/00
[58] Field of Search ........................................... 20/151, 115

[56] References Cited

UNITED STATES PATENTS

| | | |
|---|---|---|
| 3,493,874 | 2/1970 | Finkel et al. ............................ 328/151 |
| 3,214,700 | 10/1965 | Hook ....................................... 328/151 |
| 3,119,984 | 1/1964 | Brandt et al. ............................ 328/151 |
| 3,299,357 | 1/1967 | Darlington ............................... 328/151 |

Primary Examiner—Donald D. Forrer
Assistant Examiner—Harold A. Dixon
Attorney—C. Cornell Remsen, Jr., Walter J. Baum, Paul W. Hemminger, Charles L. Johnson, Jr., Philip M. Bolton, Isidore Togut, Edward Goldberg and Menotti J. Lombardi, Jr.

[57] ABSTRACT

This is an apparatus and method for selecting a constant percentage of all sampled signals of a desired amplitude. This is accomplished by sampling the signal, establishing an initial threshold level, comparing the sampled signal with the threshold level, selecting the sampled signal when the threshold level exceeds the sampled signal, and adjusting the threshold level so that the constant percentage of all sampled signals are selected.

7 Claims, 2 Drawing Figures

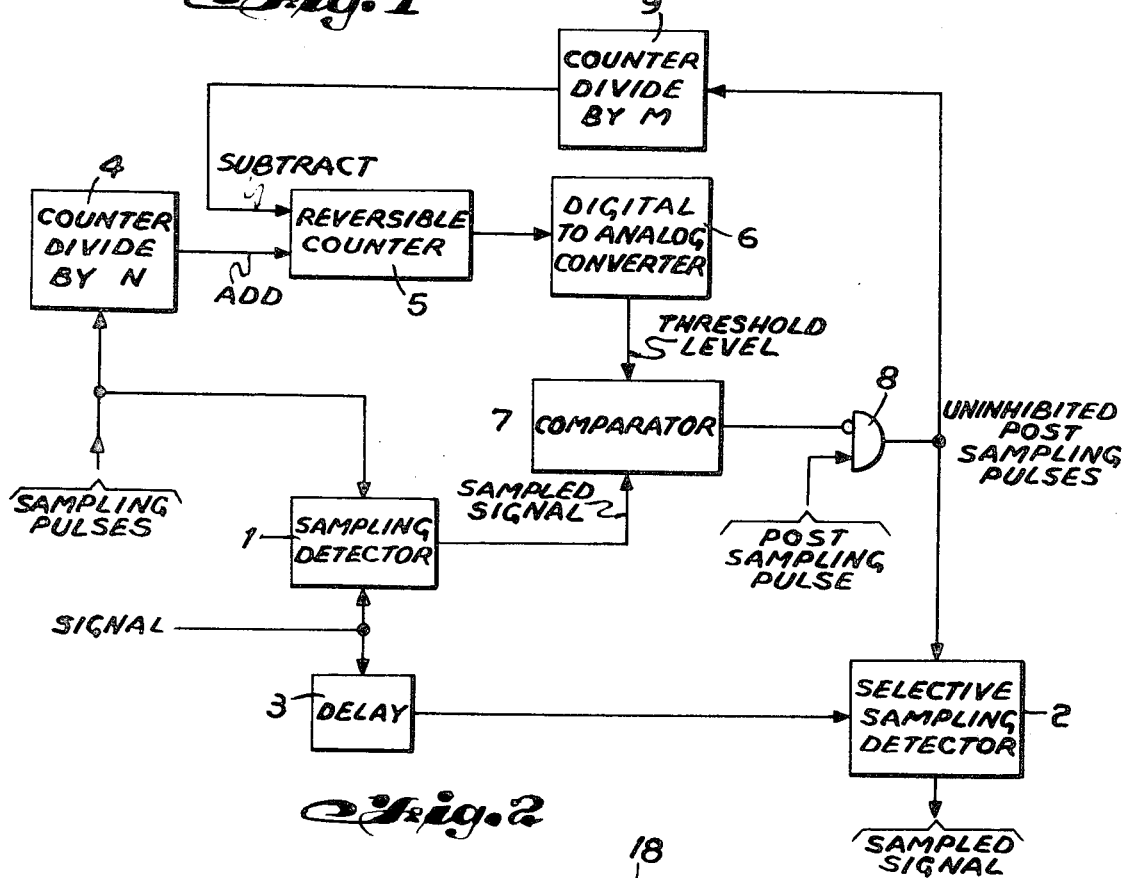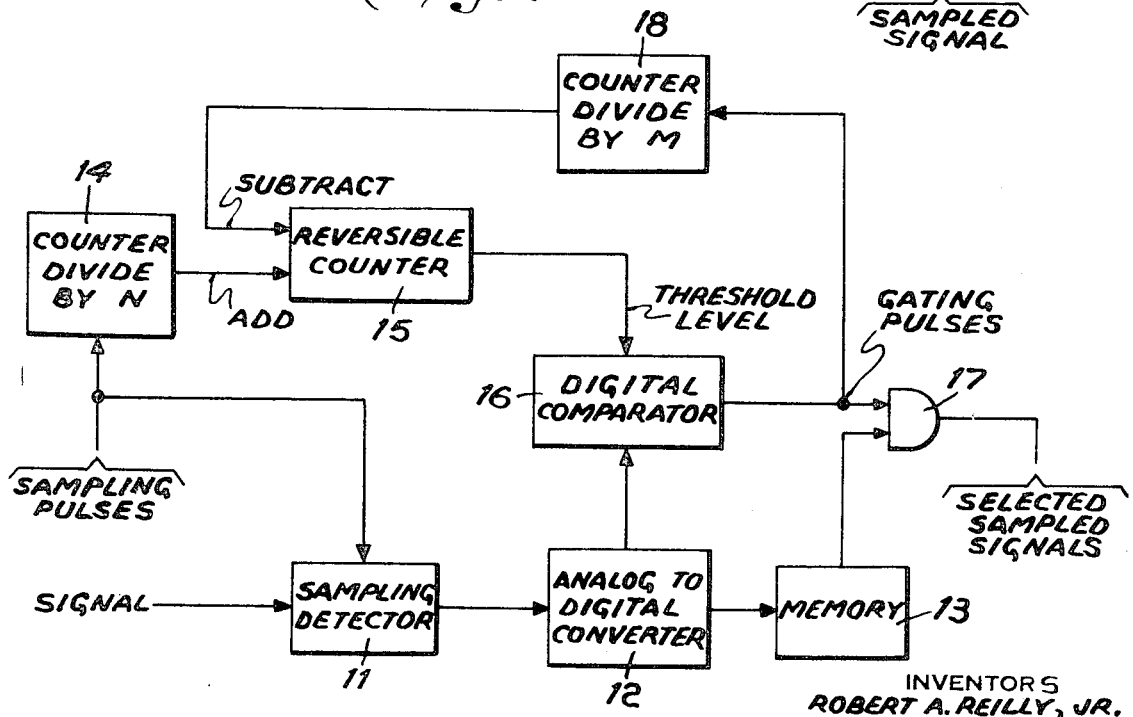

SELECTIVELY SAMPLING RECEIVED SIGNALS

BACKGROUND OF THE INVENTION

This invention relates to a method and apparatus for selecting a constant percentage of sampled signals.

A use for this invention can be applied to the particular problem now to be described, which problem is given by way of example only.

Very often in pulse sampling systems such as Loran C type systems described in Jansky and Bailey, Inc., "The Loran C System of Navigation", Report to U.S. Coast Guard, Feb., 1962; and R.A. Reilly, "Microminiature Loran C Receiver/Indicator", IEEE Transactions on Aerospace and Electronic Systems, Volume AES-2, No.-1, Pages 74–88, Jan., 1966, serious atmospheric disturbances can impair the system performance. Atmospheric disturbances such as lightning can commonly occur in certain parts of the world quite frequently during particular seasons of the year. Noise produced by lightning can result in serious errors when one is seeking to extract information from a signal by periodically sampling that signal.

SUMMARY OF THE INVENTION

It is noted that atmospheric noise will occur in a statistically determined fashion and it is found that the effect of atmospheric noise can be minimized by simply selecting a constant percentage of all sampled signals having the smallest amplitude in order to minimize the effect of random atmospheric noise.

It is an object of this invention to improve the performance of signal sampling systems.

It is a further object to provide a method and apparatus for sampling a signal to improve the performance of pulse sampling systems.

According to a broad aspect of this invention there is provided an apparatus for producing selectively sampled signals comprising means for sampling said signal, means for establishing an initial threshold level, means for comparing said sampled signal with said threshold level, means for selecting said sampled signal when said threshold level exceeds said sampled signal, and means for adjusting said threshold level so that a constant percentage of all sampled signals having a desired amplitude are selected.

According to another aspect of this invention there is provided a method of producing selectively sampled signals comprising the steps of sampling said signal, establishing an initial threshold level, comparing said sampled signal with said threshold level, selecting said sampled signal when said threshold level exceeds said sampled signal, and adjusting said threshold level so that a constant percentage of all sampled signals having a desired amplitude are selected.

BRIEF DESCRIPTION OF THE DRAWINGS

FIG. 1 shows an apparatus for sampling and selecting these sampled signals according to the invention.

FIG. 2 is an alternative embodiment according to the invention.

DESCRIPTION OF THE PREFERRED EMBODIMENT

Referring to FIG. 1, by way of example, the signal can be the 100 KC Loran C RF signal. The sampling pulse is generally, again by way of example, a 1μs pulse having a repetition rate of 1 msec wherein the sampling pulse is usually initiated at approximately 25μs after the reception of the RF signal begins. Relating this criteria to our system, the sampling pulses will be introduced approximately 25μs after the start of reception of the RF signal and the corresponding post-sampling pulses will be delayed an additional 10μs. However, in order that the actual sampling pulse will sample the same portion of the RF signal at sampling detector 1, as is sampled by a corresponding uninhibited sampling pulse at selective sampling detector 2, a delay 3 is interposed between the RF signal and the input to the selective sampling detector 2. This delay, which can be provided by any standard delay line, should correspond to the difference in time between a sampling pulse and its corresponding post-sampling pulse and as provided in this example, such delay is 10μs.

The operation of the system shown in FIG. 1 is as follows. The RF signal is applied to sampling detector 1, and the signal is actually sampled whenever the detector is activated by sampling pulses coupled thereto. This sampling detector 1 can be any standard detector circuit such as chopper amplifiers described in "Transistor Circuit Design" by Texas Instruments, Inc., 1963. The sampling pulses are also introduced into counter 4 which will divide down the number of sampling pulses by a factor N. In this example, N may be equal to 4. The output of counter 4 is fed into reversible counter 5. This reversible counter is a standard counter except that it has an add input and a subtract input. When pulses are received at the add input, the count within the reversible counter increases and when pulses are received at the subtract input, the counter reverses itself and in effect eliminates counts from the counter. Therefore, as pulses from the output of counter 4 are introduced at the add input of reversible counter 5, pulses from the output of reversible counter 5 are transmitted to a digital-to-analog converted 6, which converter establishes an initial threshold level. The threshold level from the digital-to-analog converter and the sampled signal from the sampling detector 1 are now introduced into a comparator circuit 7, which may be any differential amplifier commonly found in literature. The output of the comparator circuit can be made to produce a first voltage level when the threshold level exceeds the sampled signal, and a second voltage level when the sampled signal exceeds the threshold level. The output of the comparator circuit is fed to the control input terminal of inhibitor gate 8. Post-sampling pulses are introduced into a first input terminal of inhibitor gate 8. When the threshold level exceeds the sampled signal, the control signal at inhibitor gate 8 allows post-sampling pulses to proceed to the output terminal of inhibitor gate 8. When the sampled signal exceeds the threshold level, the corresponding control signal applied to control terminal of inhibitor gate 8 inhibits the passage of post-sampling pulses. The uninhibited post-sampling pulses are used to activate selective sampling detector 2 so as to selectively sample the RF signal. The uninhibited post-sampling pulses are also coupled to counter 9 which divides down the number of uninhibited sampling pulses received by a factor M, in this case M = 3. The output of counter 9 is coupled to the subtract input terminal of reversible counter 5 and has the effect of reducing the output count of reversible counter 5 which in turn results in adjusting the threshold level to a lower value at the output of digital-to-analog converter 6. The lower threshold value, of course, results in more post-sampling pulses being inhibited until the threshold level finally stabilizes.

The percentage of post-sampling pulses used to selectively sample the signal is determined by the ratio of M to N, which in this case is 3 to 4. This results in selecting 75 percent of all post-sampling pulses so that 75 percent of all sampled signals having the smallest amplitude are selectively sampled at selective sampling detector 2. Thus, after a period of time, if the amplitude of the signal being received decreases so that all of the sampled signals are lower than the threshold level, all the post-sampling pulses are uninhibited and are fed back to counter 9 which results in lowering the threshold level until again only a fixed percentage, i.e. 75 percent in this example, of all sampled signals having the smallest amplitude are again selected by post sampling the signal at selective sampling detector 2. Likewise, over a given period of time, if the received signals dramatically increase in value so that all the sampled signals exceed the threshold level, there are no uninhibited sampling pulses fed to counter 9 and the count within the reversible counter begins to increase more rapidly, thereby raising the threshold level until the same constant percentage, i.e. 75 percent in this example, of all sampled signals having the smallest amplitude are again selected by post sampling the signal at selective sampling detector 2.

While FIG. 1 used an analog technique for comparing the threshold level with the sampled signal, FIG. 2 shows this comparison being made using digital techniques. The operation of the apparatus shown in FIG. 2 is as follows.

The signal is again sampled at sampling detector 11 in the same manner as previously described in the sampling of the signal at detector 1 in FIG. 1. The sampled signal is fed into analog to digital converter 12, which converts the DC level of the sampled signal to an equivalent number of digital pulses. The converted sampled signal is fed into a memory 13 which can be a series of storage flip-flops forming a shift register. Meanwhile, the sampling pulses are fed into counter 14, the output of which is fed into the add input of reversible counter 15. The circuit and operation of counters 14 and 15 can be identical to the respective counters 4 and 5 of FIG. 1. However, the output of reversible counter 15, which is in digital form, establishes the threshold level and is directly fed into digital comparator 16, wherein the analog-to-digital converter 6 shown in FIG. 1 is omitted. The converted sampled signals are also fed into digital comparator 16. The digital comparator 16, which may be a standard coincidence gate, will produce gating pulses whenever the digital threshold level exceeds the converted sampled signal. The gating pulse and the output of memory 13 are fed into AND-gate 17 wherein the selected sampled signals in digital form are produced at the output of AND-gate 17. The threshold level is adjusted in the same manner as described with reference to FIG. 1, wherein the gating pulses are fed to counter 18 which is analogous to counter 9 of FIG. 1.

Since the converted sampled signals are stored in memory 13, while a decision is being made in the comparator as to whether the sampled signal should be selected, the signal need not be delayed in delay 3, and post sampled in selective sampling detector 2, as previously described with reference to FIG. 1.

It is to be understood that the above embodiments are described by way of example only and are not to be considered as a limitation upon the scope of this invention.

We claim:

1. An apparatus for producing selectively sampled signals comprising:
   means for sampling a signal;
   means for establishing an initial threshold level including:
      a counter for dividing down received sampling pulses by a factor of N; and
      a reversible counter coupled to the output of said N counter whereby the count within the reversible counter is increased by pulses received from the output of said N counter;
   means for comparing said sampled signal with said threshold level;
   means for selecting said sampled signal when said threshold level exceeds said sampled signal; and
   means for adjusting said threshold level so that a constant percentage of all sampled signals having a desired amplitude are selected.

2. An apparatus according to claim 1 wherein said sampling means includes a detector activated by a sampling pulse so as to sample said signal.

3. An apparatus according to claim 5 wherein said establishing means further includes:
   a digital-to-analog converter coupled to the output of said reversible counter for transforming said initial threshold level to analog form.

4. An apparatus according to claim 3 further comprising a delay interposed between said signal and said selecting means, said delay being the time difference between a specific sampling pulse and a corresponding post-sampling pulse.

5. An apparatus according to claim 3 wherein said comparing means includes a comparator circuit for comparing said sampled signal with said threshold level, the output of said comparator provides an indication as to whether said threshold level exceeds said sampled signal.

6. An apparatus according to claim 5 wherein said selecting means includes:
   an inhibitor gate having a control input and a first input terminal, said control input being coupled to said comparator output wherein the output of said inhibitor gate is inhibited when said sampled signal exceeds said threshold level, said first input terminal receiving post-sampling pulses wherein said post-sampling pulses are coupled to the output of said inhibitor gate when said threshold level exceeds said sampled signal; and
   a sampling detector activated by the uninhibited sampling pulses from said inhibitor gate so as to post-sample said signal.

7. An apparatus according to claim 6 wherein said adjusting means includes a counter for dividing down the received uninhibited sampling pulses by a factor of $M$, the output of said $M$ counter being coupled to an input of said reversible counter for subtracting the count in said reversible counter so that the constant percentage is equal to $M/N$, whereby the constant percentage of all sampled signals having the smallest amplitude are selected.

* * * * *